April 7, 1964 H. J. BEAUPRE ETAL 3,128,253

INFRARED DETECTOR AND METHOD OF MAKING SAME

Filed April 5, 1961

INVENTORS
Howard J. Beaupre,
Curtis M. Mesecke

BY
Stevens, Davis, Miller & Mosher
ATTORNEYS

United States Patent Office 3,128,253
Patented Apr. 7, 1964

3,128,253

INFRARED DETECTOR AND METHOD OF MAKING SAME

Howard J. Beaupre and Curtis M. Mesecke, Dallas, Tex., assignors to Texas Instruments Incorporated, Dallas, Tex., a corporation of Delaware Filed Apr. 5, 1961, Ser. No. 100,906
2 Claims. (Cl. 252—501)

Figure 1:
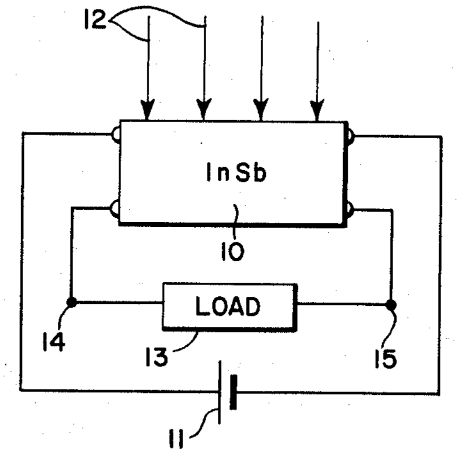

The present invention relates generally to photoconductive cells and more particularly relates to a highly efficient indium antimonide device for detecting infrared energy.

One problem which has recently been plaguing the technological world is the development of improved methods and means for detecting infrared energy. A search to discover materials suitable for infrared detection has led to the employment of indium antimonide. However, the research could not stop at this point because the indium antimonide must be doped with such impurities as to produce the right number of charge carriers in the indium antimonide to most efficiently convert incident infrared energy into electrical energy. It is not only necessary to have as many charge carriers as possible, but also the charge carriers must be distributed uniformly throughout the indium antimonide material in order to provide a most efficient, sensitive and accurate infrared detecting cell.

It has been found that for given impurity materials which have been diffused into wafers of indium antimonide the number of charge carriers varies as a function of the temperature at which the indium antimonide is maintained. As the temperature is decreased from room temperature the number of charge carriers will increase until a temperature is reached where a maximum number of charge carriers can exist in the indium antimonide, after which the number of charge carriers decreases with further decreases in temperature. The temperatures involved are quite low, and for any given impurity material a problem arises in finding suitable means for maintaining the indium antimonide at that temperature which will allow the maximum number of charge carriers to be present. It has been discovered that if mercury is used as the impurity and the operation of diffusing the mercury into the indium antimonide is carried out according to a special technique, a charge carrier concentration of $10^{16}$ per cc. can be achieved when the temperature is maintained at about 200° K. Since there are readily obtainable materials, for example, liquid Freon and liquid carbon dioxide, capable of maintaining a temperature of around 200° K., it becomes desirable to use mercury as the diffusant. The present invention is concerned with a unique, special, and highly critical method for diffusing mercury into an indium antimonide wafer to obtain a uniform and maximum charge carrier density at an operating temperature of around 200° K.

It is, therefore, an object of the present invention to provide a highly efficient photoconductive cell for detecting infrared energy which has a more uniform charge carrier distribution and which operates with greater sensitivity than prior art infrared detectors.

It is a further object of the present invention to provide a simple and efficient diffusion technique for making an indium antimonide infrared detector which has the advantageous characteristics set forth above, and which technique requires less time to obtain the desired diffusion depth and insures that the charge carriers penetrate uniformly through the wafer of indium antimonide. This not only vastly reduces any possibility of the out-diffusing of the impurity from the indium antimonide but on account of the shorter diffusion time involved, a greater control over the surface concentration of the charge carriers is obtained.

Figure 2:
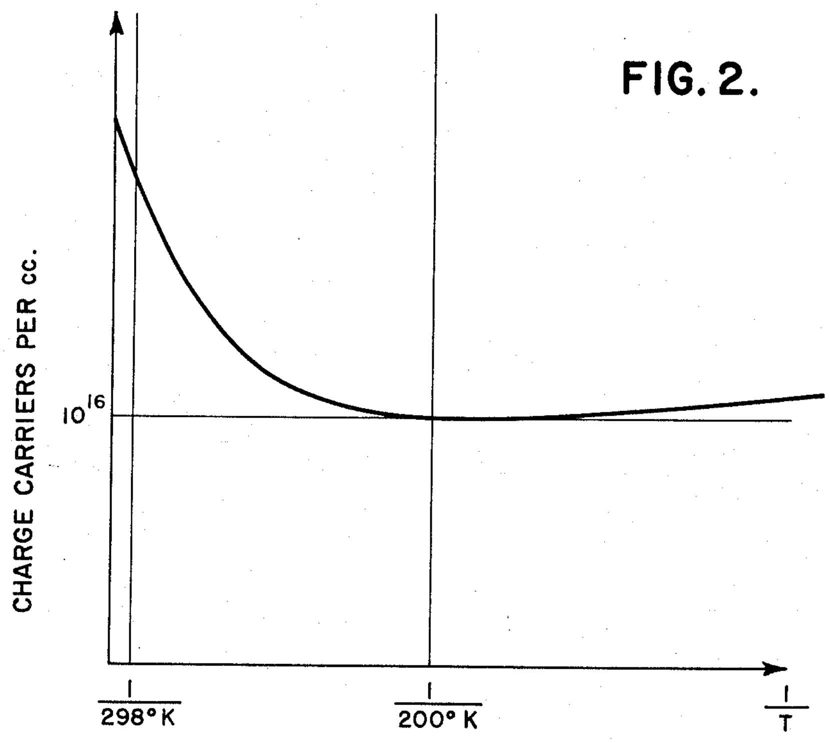

Other and further objects, advantages and characteristic features of the present invention will become readily apparent from the following detailed description of a preferred embodiment thereof when taken in conjunction with the appended drawings in which:

FIGURE 1 illustrates schematically the infrared detector provided by the present invention; and FIGURE 2 is a graph illustrating the charge carrier density as a function of temperature for an indium antimonide wafer into which mercury has been diffused in accordance with the method of the present invention.

Referring now to FIGURE 1, the indium antimonide infrared detector provided by the present invention is seen to comprise a wafer 10 of indium antimonide into which mercury has been diffused according to a critical and unique diffusion process to be hereinafter described in order to produce a uniformly distributed charge carrier density of $10^{16}$ carriers per cc. The indium antimonide wafer 10 is biased by a source of electric potential 11. Infrared energy (photons), indicated at 12, is allowed to impinge upon the indium antimonide wafer 10, and the resultant electrical current which is indicative of the amount of incident infrared energy is allowed to flow through a load 13 connected between terminals 14 and 15, which are attached to the wafer 10.

During the operation of the infrared detector, the device is maintained at a temperature of around 200° K. by cooling with a substance such as liquid Freon or solid carbon dioxide. As will be evident from FIGURE 2, at a temperature of 200° K. the charge carrier density is at a value of $10^{16}$ per cc.

The method for making the highly efficient infrared detecting cell 10 is as follows. A wafer of indium antimonide is obtained and lapped to the desired size. Mercury is then diffused into the indium antimonide wafer by means of a long term diffusion operation. The diffusion is carried out in a chamber which has been evacuated to a pressure of less than $10^{-6}$ mm. Hg. and heated to a temperature of around 480° C. Mercury vapor is introduced into the chamber, and the indium antimonide wafer is subjected to the mercury vapor for a time of from 24 to 72 hours. After this time has elapsed, the mercury vapor supply is turned off, the chamber is cooled to room temperature, and the wafer is removed from the chamber. As a result of the diffusion operation, the mercury atoms will not only have penetrated the surface of the indium antimonide wafer but will have actually saturated the entire wafer and will be uniformly distributed throughout the wafer at a concentration of $10^{16}$ carriers per cc. The diffused indium antimonide wafer 10 is then connected into the circuit shown in FIGURE 1, and after immersion in a suitable coolant, is ready for operation as a highly efficient infrared detector.

Although the present invention has been shown and described with reference to a particular embodiment, nevertheless various changes and modifications obvious to one skilled in the art are deemed to be within the spirit, scope, and contemplation of the invention.

What is claimed is:

1. An infrared detector comprising a body of indium antimonide having a sufficient quantity of mercury atoms therein to provide a concentration of charge carriers in said body supplied by said mercury of around $10^{16}$ per cc. when said body is at a temperature of about 200° K.

2. A method of making an infrared detector comprising diffusing mercury vapor into a body of indium antimonide in a chamber evacuated to a pressure of less than $10^{-6}$ mm. of Hg and heated to about 480° C. for a time between 24 and 72 hours to produce a uniform distribution of charge carriers in said body.

References Cited in the file of this patent

UNITED STATES PATENTS 2,793,275 Breckenridge et al. -------- May 21, 1957

OTHER REFERENCES

Goldstein: The Diffusion of Zn in InSb, article in "Properties of Elemental and Compound Semiconductors," edited by Gatos, published by Interscience Publishers, New York, pages 155–160.